United States Patent
Darrah et al.

(10) Patent No.: US 6,677,554 B2
(45) Date of Patent: Jan. 13, 2004

(54) SELECTIVE LASER SINTERING WITH OPTIMIZED RASTER SCAN DIRECTION

(75) Inventors: James F. Darrah, Austin, TX (US); Xiaoshu Zu, Austin, TX (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 10/206,647

(22) Filed: Jul. 26, 2002

(65) Prior Publication Data

US 2003/0127436 A1 Jul. 10, 2003

(30) Foreign Application Priority Data

Jul. 31, 2001 (GB) .............................................. 0118650

(51) Int. Cl.[7] .......................... B23K 26/00; G06F 19/00
(52) U.S. Cl. .............................. 219/121.85; 219/121.8; 700/119; 700/166
(58) Field of Search ................................ 700/166, 117, 700/118, 119; 219/121.6, 121.85, 121.61, 121.8

(56) References Cited

U.S. PATENT DOCUMENTS

| | | |
|---|---|---|
| 4,247,508 A | 1/1981 | Housholder |
| 4,863,538 A | 9/1989 | Deckard |
| 4,944,817 A | 7/1990 | Bourell et al. |
| 5,017,753 A | 5/1991 | Deckard |
| 5,076,869 A | 12/1991 | Bourell et al. |
| 5,132,143 A | 7/1992 | Deckard |
| 5,155,324 A | 10/1992 | Deckard et al. |
| 5,352,405 A * | 10/1994 | Beaman et al. ........ 219/121.85 |
| 5,609,813 A | 3/1997 | Allison et al. |
| 5,640,667 A * | 6/1997 | Freitag et al. |
| 6,085,122 A | 7/2000 | Manning |
| 6,151,345 A | 11/2000 | Gray |
| 2002/0015654 A1 * | 2/2002 | Das et al. ................. 219/121.8 |
| 2003/0028278 A1 * | 2/2003 | Darrah et al. ................ 700/119 |

* cited by examiner

*Primary Examiner*—Geoffrey S. Evans
(74) *Attorney, Agent, or Firm*—Ralph D'Alessandro; Anderson, Levine & Lintel

(57) ABSTRACT

A computer-controlled apparatus and method for fabricating three-dimensional articles in layerwise fashion is disclosed. Upon dispensing a layer of a fusible powder, a laser irradiates selected locations of that layer to fuse the powder into a cross-section of the article to be formed in that layer, such that the fused cross-sections fuse together into the article. The laser is controlled in a raster scan fashion across the selected locations of the powder layer. The raster scan lines are defined, for each cross-section, to achieve an optimal fill scan time. The optimal fill scan time is determined, by the computer estimating the fill scan time by rotating the cross-section over a plurality of rotational angles, and estimating the fill scan time for each of the rotated cross-sections for at least a sample of the fill scans necessary to form the article. The actual fill scan vectors to be used in selective laser sintering of the article are rotated, from a coordinate axis at the target plane, according to the rotation of the cross-section providing the lowest estimated fill scan time.

16 Claims, 6 Drawing Sheets

SELECTIVE LASER SINTERING WITH OPTIMIZED RASTER SCAN DIRECTION

CROSS-REFERENCE TO RELATED APPLICATIONS

This application is related to copending and commonly assigned application Ser. No. 10/205,698 entitled "Selective Laser Sintering With Interleaved Fill Scan", filed contemporaneously with this application, and incorporated herein by this reference.

STATEMENT REGARDING FEDERALLY SPONSORED RESEARCH OR DEVELOPMENT

Not applicable.

BACKGROUND OF THE INVENTION

This invention is in the field of rapid prototyping, and is more specifically directed to the fabrication of three-dimensional objects by selective laser sintering.

The relatively new field of rapid prototyping has provided significant improvements in providing high strength, high density, parts useful for design verification and in pilot production. "Rapid prototyping" generally refers to the manufacture of articles directly from computer-aided-design (CAD) data bases in an automated fashion, rather than by conventional machining of prototype articles according to engineering drawings. As a result, the time required to produce prototype parts from engineering designs has been reduced from several weeks to a matter of a few hours.

By way of background, an example of a rapid prototyping technology is the selective laser sintering process practiced in systems available from 3D Systems, Inc. of Valencia, Calif., in which articles are produced from a laser-fusible powder in layerwise fashion. According to this process, a thin layer of powder is dispensed and then fused, melted, or sintered, by laser energy at those portions of the powder layer that correspond to a cross-section of the article in that layer. Conventional selective laser sintering systems, such as the SINTERSTATION 2500plus system available from 3D Systems, Inc., position the laser beam by way of galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The laser may be scanned across the powder in raster fashion, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, the next layer of powder is then dispensed, and the process is repeated, with fused portions of later layers fusing to fused portions of previous layers (as appropriate for the article), until the article is complete.

More detailed descriptions of the selective laser sintering technology are provided by U.S. Pat. No. 4,863,538, U.S. Pat. No. 5,132,143, and U.S. Pat. No. 4,944,817, all assigned to Board of Regents, The University of Texas System, and in U.S. Pat. No. 4,247,508 assigned to 3D Systems, Inc., all incorporated herein by this reference. Laser power control systems for selective laser sintering systems are described in U.S. Pat. No. 6,085,122, issued Jul. 4, 2000, and in U.S. Pat. No. 6,151,345, issued Nov. 21, 2000, both assigned to 3D Systems, Inc., and also incorporated herein by reference. By way of further background, U.S. Pat. No. 5,352,405, issued Oct. 4, 1994 assigned to 3D Systems, Inc., and incorporated herein by reference, describes a method of scanning the laser across the powder in a selective laser sintering apparatus to provide a uniform time-to-return of the laser for adjacent scans of the same region of powder, thus providing uniform thermal conditions over the cross-section of each of multiple parts within the same build cylinder.

The selective laser sintering technology has enabled the direct manufacture of three-dimensional articles of high resolution and dimensional accuracy from a variety of materials including polystyrene, NYLON, other plastics, and composite materials such as polymer coated metals and ceramics. Polystyrene parts may be used in the generation of tooling by way of the well-known "lost wax" process. In addition, selective laser sintering may be used for the direct fabrication of molds from a CAD database representation of the object to be molded in the fabricated molds; in this case, computer operations "invert" the CAD database representation of the object to be formed, to directly form the negative molds from the powder.

FIG. 1 illustrates, by way of background, the construction and operation of a conventional selective laser sintering system 100. As shown in FIG. 1, selective laser sintering system 100 includes a chamber 102 (the front doors and top of which are not shown in FIG. 1, for purposes of clarity). Chamber 102 maintains the appropriate temperature and atmospheric composition (typically an inert atmosphere such as nitrogen) for the fabrication of the article.

The powder delivery system in system 100 includes feed piston 114, which is controlled by motor 116 to move upwardly and lift a volume of powder into chamber 102. Two feed pistons 114 may be provided on either side of part piston 106, for purposes of efficient and flexible powder delivery, as used in the SINTERSTATION 2500plus system available from 3D Systems, Inc. Part piston 106 is controlled by motor 108 to move downwardly below the floor of chamber 102 by a small amount, for example 0.125 mm, to define the thickness of each layer of powder to be processed. Roller 118 is a counter-rotating roller that translates powder from feed piston 114 to target surface 104. Target surface 104, for purposes of the description herein, refers to the top surface of heat-fusible powder disposed above part piston 106; the sintered and unsintered powder disposed on part piston 106 will be referred to herein as part bed 107. Another known powder delivery system feeds powder from above part piston 106, in front of a delivery apparatus such as a roller or scraper.

In conventional selective laser sintering system 100 of FIG. 1, a laser beam is generated by laser 110, and aimed at target surface 104 by way of scanning system 142, generally including galvanometer-driven mirrors that deflect the laser beam. The deflection of the laser beam is controlled in combination with modulation of laser 110 itself, to direct laser energy to those locations of the fusible powder layer corresponding to the cross-section of the article to be formed in that layer. Scanning system 142 may scan the laser beam across the powder in a raster-scan fashion, or in vector fashion. Cross-sections of articles are often formed in a powder layer by scanning the laser beam in vector fashion along the outline of the cross-section in combination with a raster scan that "fills" the area within the vector-drawn outline.

FIG. 2 illustrates a portion of target surface 104 at which four cross-sections 50 of one or more articles are being formed in a top layer of powder according to a conventional selective laser sintering method. In this example, cross-sections 50 are equally-sized rectangles, but at different angular orientations from one another relative to the x-y plane of target surface 104. As shown in FIG. 2, each of these cross-sections 50 are formed by raster scans of the laser beam across the powder of target surface 104, along scan lines 62. Also as shown in FIG. 2, each of the scan lines 62 are parallel to the x-axis in the coordinate system of target surface 104; as such, the x-axis is the "fast" scan axis for the raster scan of the laser beam, while the y-axis is the "slow" axis as it is the direction in which the raster scans advance upon completion of each scan.

According to the conventional technique illustrated in FIG. 2, the number of uniformly spaced raster scan lines 62 required to form a given cross-section 50 depends upon the orientation of the cross-section 50 in the x-y coordinate plane of target surface 104. In this example, four scan lines 62 are required to scan horizontally-oriented cross-section 50a. Eighteen and fifteen scan lines are required for angularly oriented cross-section 50c and 50b, respectively. Vertically oriented cross-section 50d requires thirteen scan lines 62. The spacing of scan lines 62 is selected by the operator of the selective laser sintering system, depending upon factors such as the desired structural strength of the resulting article, thickness of the powder layers, surface texture, and build speed. Thermal factors related to the scanning of the laser beam in the selective laser sintering process are described in the above-incorporated U.S. Pat. No. 5,352,405.

It has been observed, in connection with the present invention, that the number of raster scans (e.g., scan lines 62, in FIG. 2) is a significant factor in the overall time required to build an article by way of selective laser sintering. It has been discovered, in connection with the present invention, that a reduction in the number of scans performed in a given layer will therefore translate into a reduced build time, even if the scans are longer as a result. In addition, considering that the selective laser sintering apparatus must store vectors corresponding to the raster scan lines, in its memory, a reduction in the number of raster scan lines will result in fewer vectors to be stored in computer memory, and thus in more efficient use of computer resources.

BRIEF SUMMARY OF THE INVENTION

It is therefore an object of the present invention to provide a selective laser sintering method and apparatus in which the build time of an article is reduced by reducing the number of raster scan lines required for each cross-section of the article.

It is a further object of the present invention to provide such a method and apparatus for which the computer memory requirements for storage of control vectors can be optimized.

It is a further object of the present invention to provide such a method and apparatus for fabricating an article with optimized tensile strength along its major axes.

It is a further object of the present invention to provide such a method and apparatus for fabricating an article for which rough surface area due to vector ends can be minimized.

Other objects and advantages of the present invention will be apparent to those of ordinary skill in the art having reference to the following specification together with its drawings.

The present invention may be implemented into a method and apparatus for fabricating an article by selective laser sintering, in which the direction of raster scanning is optimized for each cross-section of the article. A computer associated with the selective laser sintering apparatus derives scan vectors for each article cross-section. In deriving the vectors, the scan time of the article cross-section is simulated or otherwise calculated, using several trial orientations of the cross-section. The scan vectors are then derived for the optimal orientation of the cross-section, and then stored in computer memory. The process is repeated separately for each cross-section to be formed in a given layer of powder, and for each layer of powder in the build cycle.

DETAILED DESCRIPTION OF THE INVENTION

Figure 1:
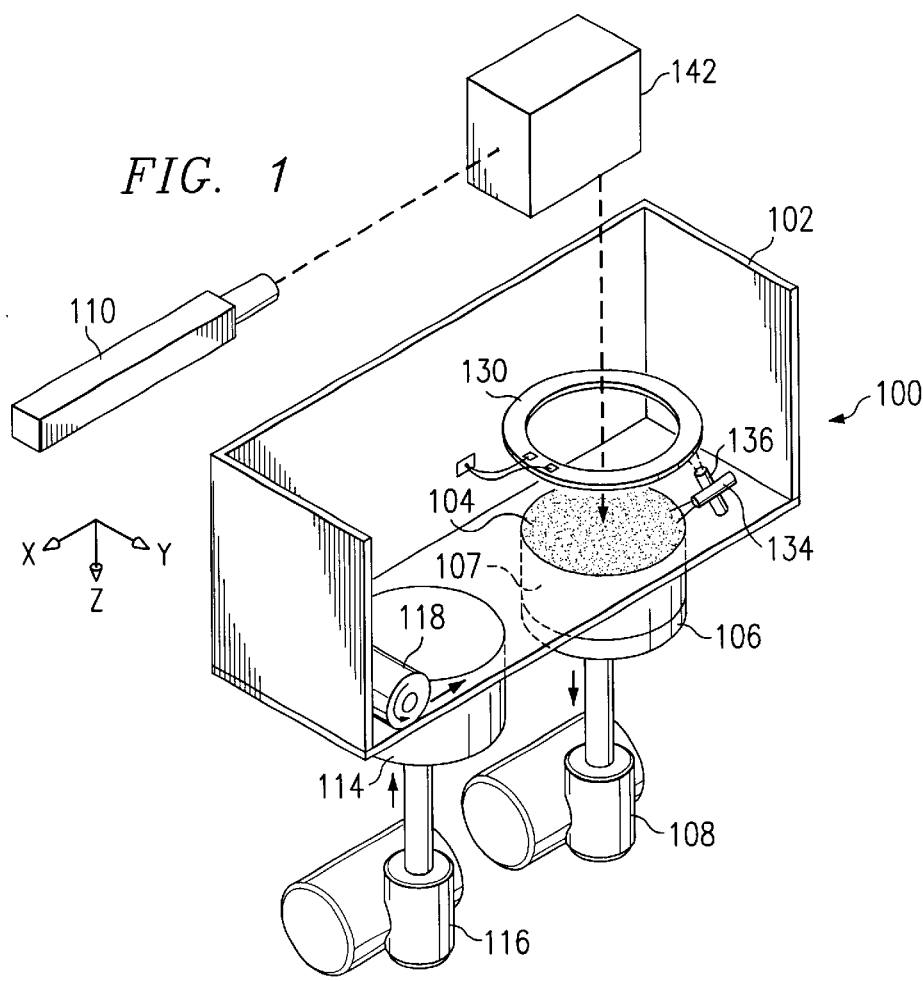
FIG. 1 is a schematic diagram, in perspective view, of a conventional selective laser sintering apparatus.

As will become apparent from the following description, the present invention is beneficial when applied to rapid prototyping systems that utilize lasers in the fabrication of articles from computer readable representations of those articles, such as those created by computer-aided-design (CAD) or computer-aided-manufacturing (CAM) systems. It is contemplated that the present invention is particularly beneficial when applied to rapid prototyping methods that are based upon a thermal mechanism. As is well-known in the art, selective laser sintering is a rapid prototyping approach that uses a thermal mechanism to form the article, in that particles of powder in selected locations of each of a sequence of layers are fused to one another at locations that receive laser energy. The fusing or binding of particles at the selected locations takes place through one of a number of thermal mechanisms, including sintering (in its traditional sense), melting and resolidification, initiation of a chemical reaction (including thermosetting), or some other thermally based mechanism; for purposes of this description, and as consistent in the rapid prototyping field, all of these mechanisms will be referred to as "sintering". Accordingly, the following description will be directed to a selective laser sintering system. It is of course to be understood that the present invention may be used to benefit in other types of rapid prototyping systems that involve a thermal mechanism.

Fabrication of a cross-section of the desired article or articles is effected by laser 110, which provides a beam which is directed by scanning system 142 in the manner described in the U.S. patents referred to hereinabove and as will now be described relative to FIG. 3. Laser 110 includes, in addition to a laser itself, such conventional control elements as described in the above-referenced U.S. Pat. No. 4,863,538, including for example a front mirror assembly, and focusing elements such as diverging and converging lenses. The type of laser 110 used depends upon many factors and in particular upon the type of powder that is to be sintered. For many types of conventional powders, a preferred laser is a 100 watt $CO_2$ type laser with controllable power output, although lasers having as low as 25 watt power output are useful with some materials. Laser 110, when on, emits laser beam 105 that travels generally along the path shown by the arrows in FIG. 3.

Computer 140 and scanning system 142 control the direction of laser beam 105 as it impinges target surface 104. In this preferred embodiment of the invention, computer 140 includes a controlling microprocessor for scanning system 142 and further includes a system for storing a computer readable representation of the article or articles being produced, such as a CAD/CAM data base or data files generated from such a database, at least in slice-by-slice form if not in entirety, to define the dimensions of the article or articles being produced. A conventional personal computer workstation, such as a microprocessor-based personal computer that includes floating point capabilities, is suitable for use as computer 140 in the preferred embodiment of the invention. Computer 140 generates signals on lines AIM to scanner processor 103, in scanning system 142, to direct laser beam 105 across target surface 104 according to the cross-section of the article to be produced in the current layer of powder. Laser power control system 150 controls the power of laser 110 in response to control signals from computer 140 and feedback signals from scanner processor 103; an example of advanced laser power control that may be used in connection with this embodiment of the invention is described in the above-incorporated U.S. Pat. No. 6,151,345.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147, which are driven by respective galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. Scanner processor 103 in scanning system 142 controls the movement of galvanometers 148, 149 to control the aim of laser beam 105 within target surface 104, in response to the signals on lines AIM from computer 140 that are generated according to the computer readable representation produced from a CAD/CAM data base, which defines the cross-section of the article to be formed in the layer of powder at target surface 104. Other scanning systems may alternatively be used in connection with this invention, including, for example, an x-y gantry system that delivers energy beams by way of a fiber optic cable.

Figure 3:
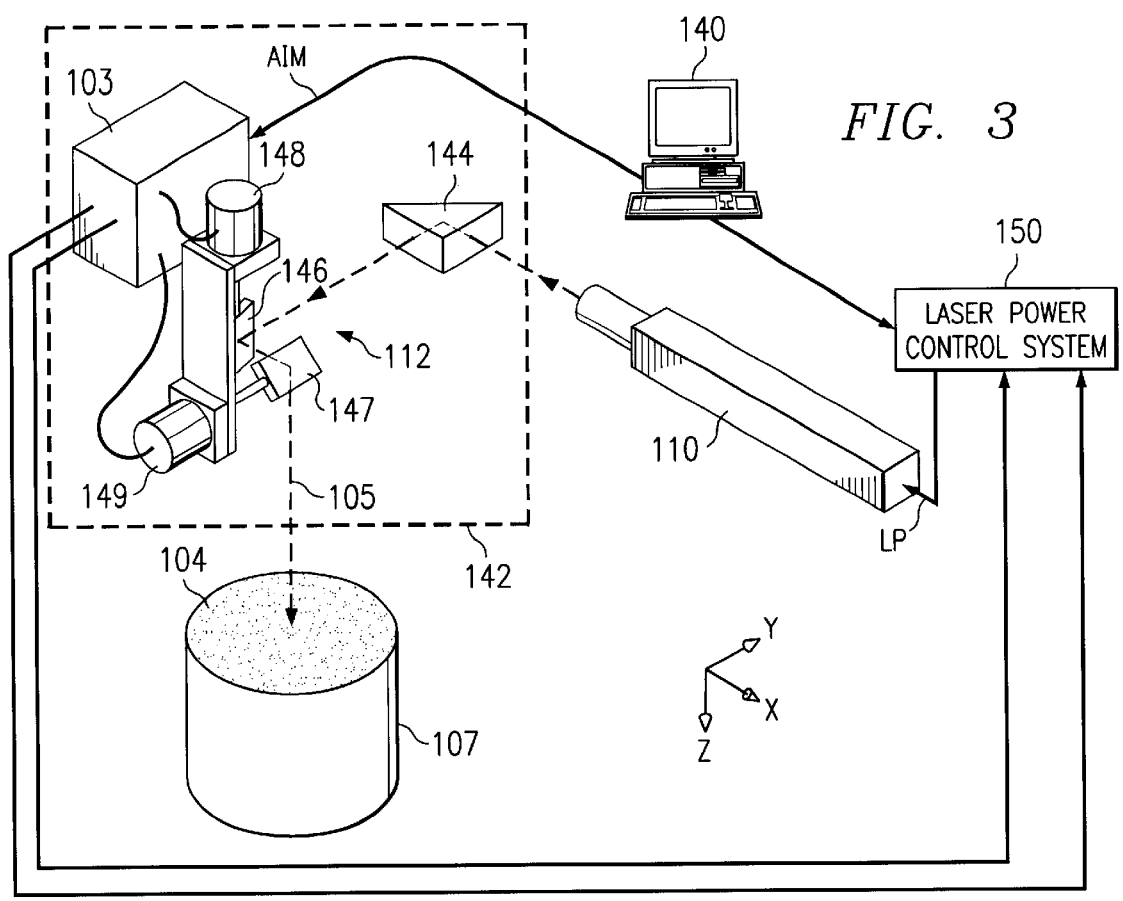
FIG. 3 is a schematic diagram, in a perspective view, of a selective laser sintering apparatus utilizing the preferred embodiment of the invention.
Figure 4:
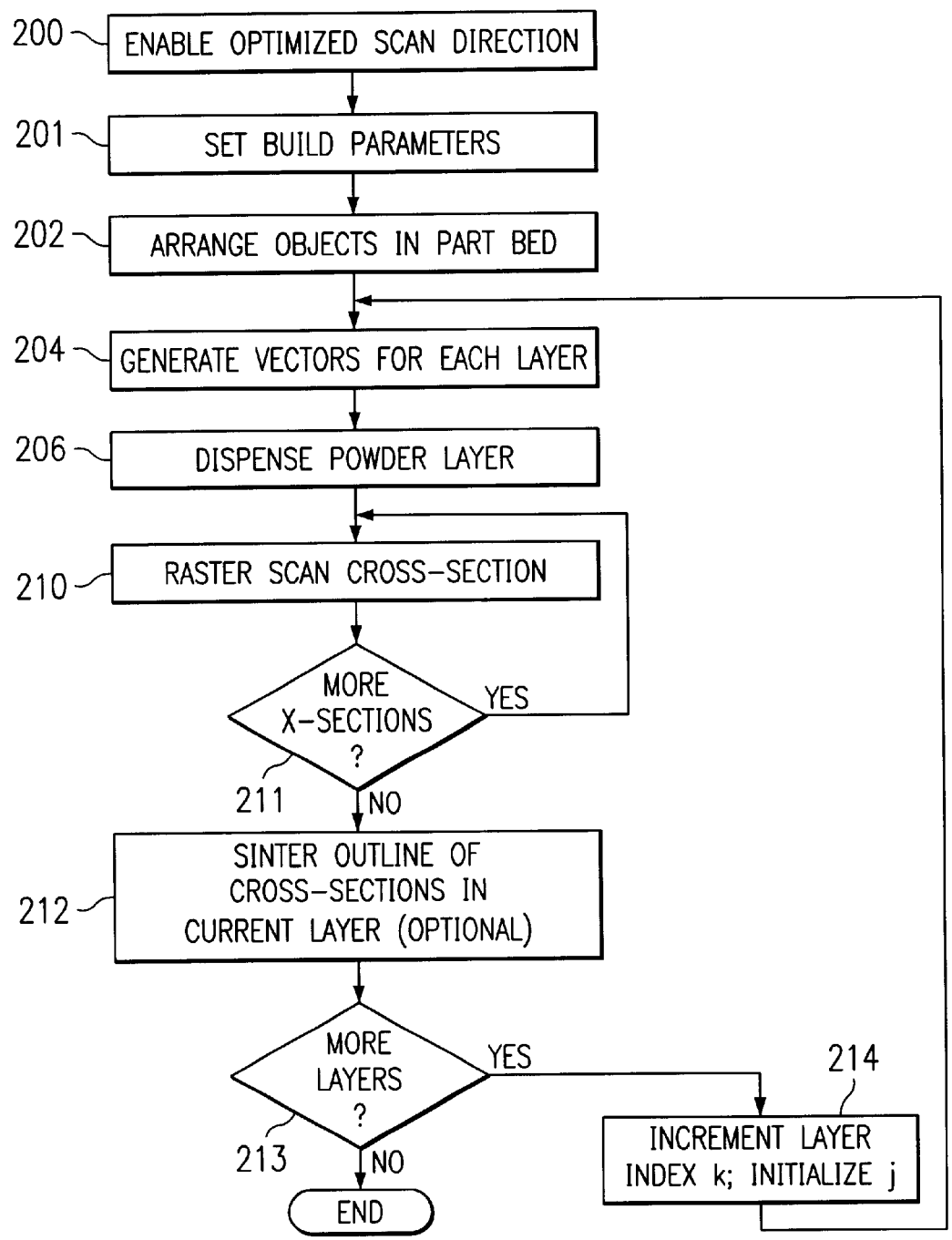
FIG. 4 is a flow diagram illustrating a method of fabricating an article in layerwise fashion according to the preferred embodiment of the invention.

Referring now to FIG. 4, the operation of computer 140 in controlling laser beam 105 according to the preferred embodiment of the invention will be described in detail. This operation begins with several processes (not shown in FIG. 4) in which parameters are established for a given build cycle. As known in the art, a build cycle refers to a cycle of operation of the system of FIG. 3, in which one or more articles are formed in layerwise fashion in one instance of part bed 107. For this build cycle, as conventional in the art, the desired powder material is selected by the human user. Computer 140 in turn reads a file to load various build parameters such as laser power, part bed temperature, and the like.

The process begins with the enabling of scan direction optimization by the human user of selective laser sintering system 100 in process 200. The optimization of scan directions is contemplated to be an optional feature in selective laser sintering, and as such is expected to be selectable for each build cycle by the user. If scan direction optimization is not enabled, generation of the fill vectors for each layer of powder will be performed in the conventional manner. Following enabling of the optimization of the scan direction in process 200, certain build parameters are set by the human user, and stored in the memory of computer 140, in process 201. These build parameters include those that are necessary to define the scanning of laser beam 105 in the build cycle, including the thickness of the powder layers to be dispensed, and the scan fill spacing, or pitch, between adjacent raster scan lines. Other related parameters such as laser spot size, scan speed, and the like may also be set in process 201, if not previously stored in computer 140. In process 202, the human user of system 100 arranges, with the assistance of computer 140, the article or articles to be fabricated within part bed 107 in this build cycle. Of course, if multiple articles are to be fabricated, these articles are arranged to fit within part bed 107. It will be apparent to those skilled in the art having reference to this specification that processes 200, 201, 202 may be performed in any order.

Figure 5:
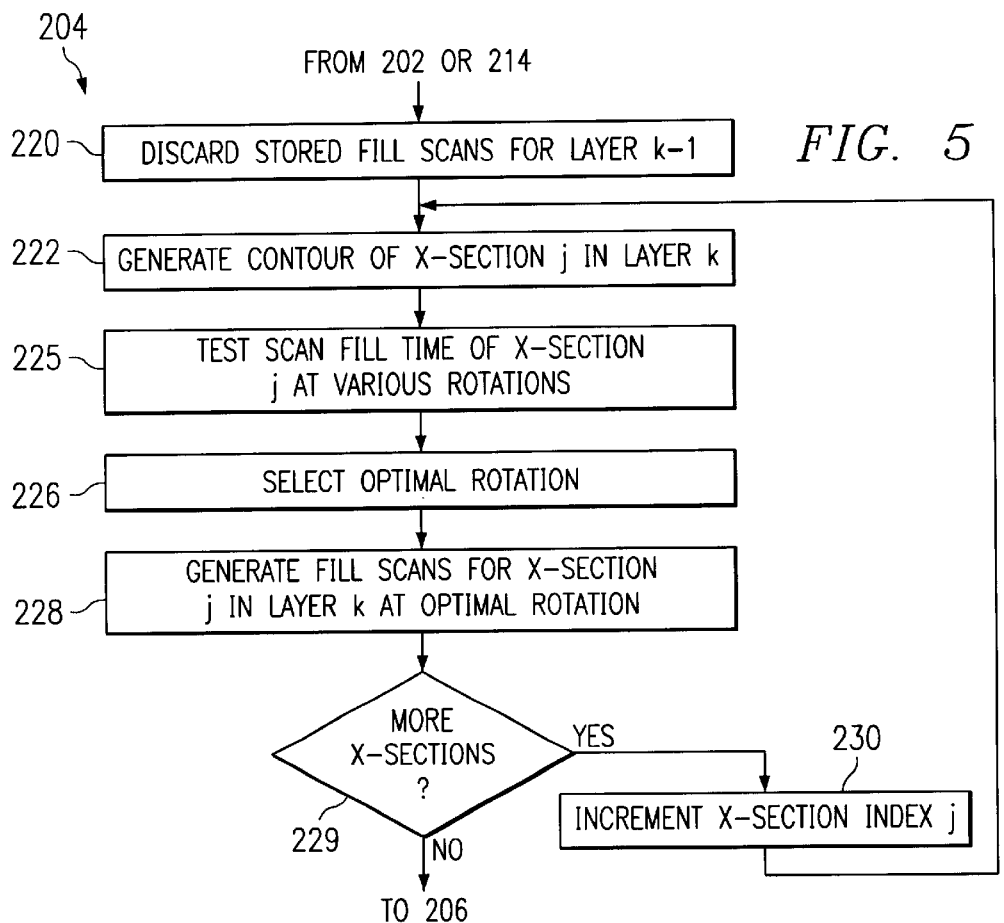
FIG. 5 is a flow diagram illustrating a method of generating the fill vectors for each cross-section of an article in each layer, in the method of FIG. 4 according to the preferred embodiment of the invention.

Individual layers, and individual cross-sections of the articles to be formed in those individual layers, are now processed beginning with process 204. In process 204 of FIG. 4, computer 140 receives a computer readable representation of the articles to be formed in the current selective laser sintering build cycle, and generates the set of outline and fill vectors to be traced in each layer of powder, referenced to a coordinate system of target surface 104 at the top layer of powder in part bed 107. The generation of the vectors in process 204 may be performed in real-time during the build itself, for example by generating the vectors for the next layer during the selective laser sintering of a prior layer, or alternatively process 204 may be carried out as a batch operation, for all layers in the build cycle prior to initiating selective laser sintering. In addition, all or part of process 204 may be performed by computer 140 in system 100, or alternatively by a separate off-line computer. For purposes of this description, process 204 will be described as a real-time process, performed by computer 140. Referring now to FIG. 5, process 204 for generating the fill vectors for one or more cross-sections of articles to be formed in each of the layers of the build cycle, according to the preferred embodiment of the invention, will be described in detail.

For purposes of this description, the current layer of powder for which computer 140 is generating the fill vectors will be referred to as layer k, and the current article cross-section upon which computer 140 is operating will be referred to as cross-section j. It is of course understood that multiple article cross-sections within the same layer may belong to different articles, or to the same article, depending upon the particular geometries of the desired articles. As will become apparent from the following description, according to the preferred embodiment of the invention, the vectors for each layer are generated substantially one layer at a time, for the current (or next) layer k of powder that is to be selectively sintered by laser beam 105. To conserve memory, therefore, process 220 is first performed, according to the preferred embodiment of the invention, to discard the stored vectors for a previous layer (e.g., k-1 or earlier) from the memory of computer 140, once those stored vectors have been used in selective laser sintering. The layer for which the vectors are discarded may be the immediately prior layer to the current layer, or may be for a layer even further back in the process, depending upon the memory resources of computer 140 and any "pipelining" of the vector generation that is implemented.

According to this preferred embodiment of the invention, a set of contour vectors are then defined for current cross-section j in current layer k, in process 222. These contour vectors will be defined relative to an x-y coordinate system applied to the target plane of system 100, with the origin of this coordinate system (and the assignment of the x and y axis directions) being arbitrarily assigned. Typically, in a two-mirror scanning system as described above relative to system 100 in FIG. 3, the fast scan axis (i.e., the x-axis) will be parallel to the line traced by laser beam 105 when mirror 147 is rotated and mirror 146 is held fixed, while the slow scan axis (e.g., the y-axis) will be parallel to the line traced by laser beam 105 when mirror 146 is rotated and mirror 147 is held fixed.

Figure 6:
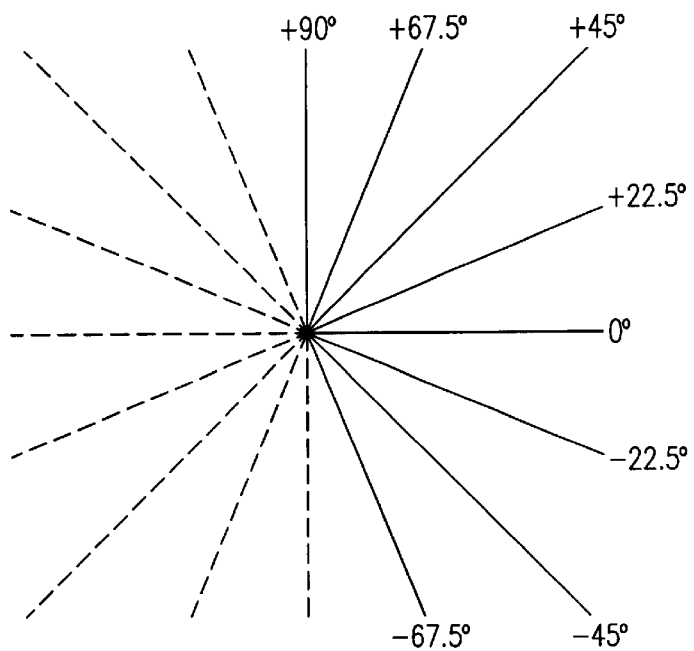
FIG. 6 is a coordinate plane diagram illustrating an example of a set of rotational angles as used in the method of FIG. 5 according to the preferred embodiment of the invention.
Figure 7:
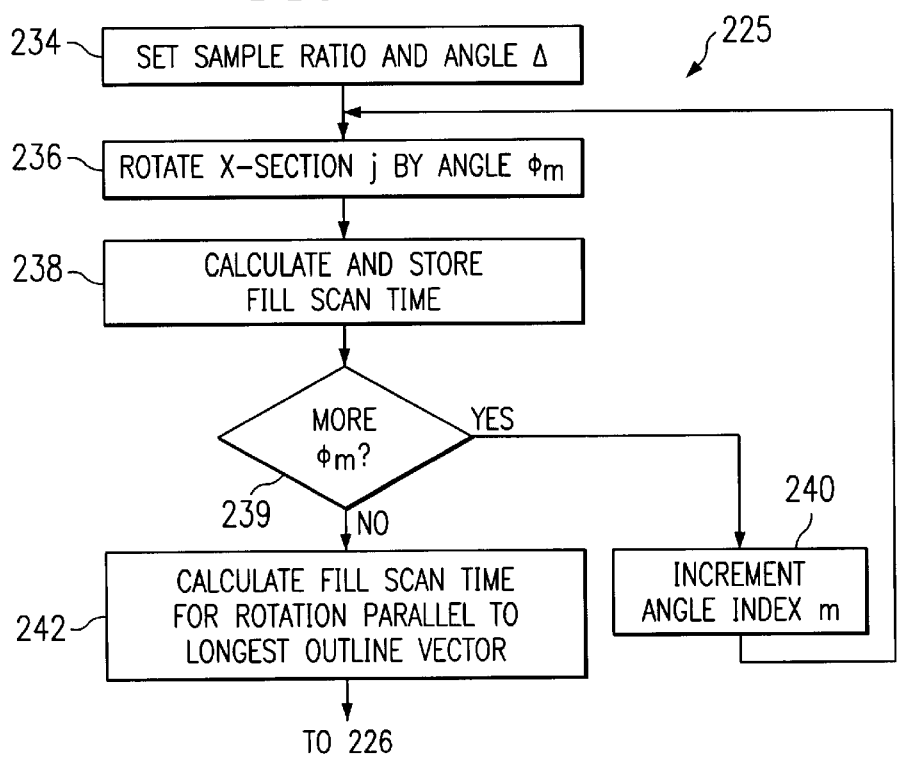
FIG. 7 is a flow diagram illustrating a method of testing sampled rotations of an article cross-section to determine the optimal scan orientation in the method of FIG. 5 according to the preferred embodiment of the invention.

Once the contour of cross-section j in layer k is defined by computer 140 in process 222, process 225 is next performed to evaluate and test the fill scan time for this cross-section at multiple rotational angles, so that the scan time of this cross-section can be optimized according to the preferred embodiment of the invention. In summary, computer 140 will effectively simulate the scanning of the current cross-section j in current layer k at several rotations from its position as arranged in process 202. The results of these simulations will determine an optimal orientation for the fast scan axis in the scanning this cross-section j; this optimal orientation is that at which the shortest scan fill time is obtained. Attention is now directed to FIGS. 6 and 7, relative to which the steps of process 225 according to the preferred embodiment of the invention will be described in detail.

FIG. 6 illustrates an exemplary set of angles of rotation in the x-y plane corresponding to target surface 104 at the top layer of powder in part bed 107 of system 100. In this example, eight possible rotations are shown, ranging from a rotation of +90° to a rotation of −67.5° including no rotation (i.e. rotation of 0°). The sample rotations in this example are separated by 22.5°, or one-sixteenth of a rotation. The other angles (rotations from +112.5° to −90°) opposing the eight rotations from +90° to −67.5°, and need not be included in process 224, because their associated scan times will be identical to those of their corresponding opposites.

Referring now to FIG. 7, process 225 begins with the selection of certain parameters to be used in the testing or simulation. Because process 225 is a simulation or calculation, the actual structural strength of the object is not pertinent, and thus the spacing of the fill scans in process 225 can be expanded from that which will actually be used. It is therefore contemplated that a fair comparison of the scan times can be derived by simulating the time required to scan a fraction of the actual scans that will be carried out. In process 234, therefore, the user selects a sample ratio, which is the ratio of the number of scans to be evaluated in process 225 for the current cross-section, relative to the number of scans that selective laser sintering system 100 will actually carry out in fabricating the cross-section. It is contemplated that a ratio of 1:2 will often provide an accurate relative measure of the fill scan times of the various rotations, while still reducing the computational time and resources of the simulation. Also in process 234, the user of computer 140 selects the incremental angle of rotation between simulated rotations; in the example of FIG. 6, the incremental angle $\Delta$ is 22.5°.

The iterative simulation and calculations of sample fill times begins with process 236, in which current x-section j is "rotated" by angle $\phi_m$ according to a rotation index m. As noted above, the angle of rotation $\phi_m$ includes no rotation, or $\phi_m=0°$. In process 238, computer 140 calculates the time that would be required to fill carry out a fill scan of cross-section j of layer k, when rotated by the current angle $\phi_m$. This calculation of process 238 is performed for the number of scans determined by the sample ratio selected in process 234, but otherwise is intended to sum the time required for the particular scan itself along the fast scan direction (x-direction), plus the incrementing in the slow scan axis (y-direction). For improved accuracy, additional time for each scan line can include acceleration and deceleration times at the ends of the vectors, as described in the above-incorporated U.S. Pat. No. 6,085,122, and any time required for scanning the laser beam outside of the outline of cross-section j. These factors are important in the actual simulation and calculation of process 238, considering that approximately the same scan fill area is subsumed by cross-section j, regardless of the orientation of the fill scan lines, which indicates that the actual true scan time is constant over the various rotations. However, because of the overhead time involved in connection with each linear scan, regardless of its length, the number of scans is preferably minimized in determining the optimum cross-section orientation for selective laser sintering.

Figure 8A:
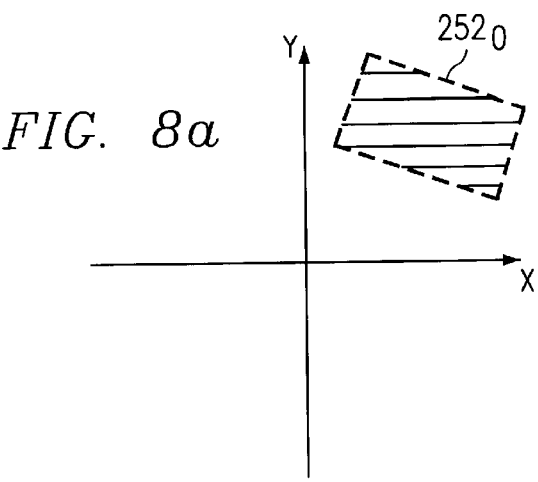
FIGS. 8a through 8d are plan views illustrating an example of the method of FIG. 7 according to the preferred embodiment of the invention.

FIG. 8a illustrates an exemplary cross-section $252_0$, in its position in the x-y plane as arranged in process 220; in other words, at a rotational angle $\phi_m$ of 0°. In this representation of FIG. 8a, the sampled fill scan lines are parallel to the x-axis. These sampled fill scan lines are separated relatively widely from one another, as described above, considering that process 238 is a simulation only, and therefore the derived scans need not be so closely spaced as to form a unitary cross-section. Indeed, it is preferred to not store the actual simulated fill scans themselves in the memory of computer 140 for cross-section $252_0$, beyond the completion of process 238, to conserve the memory resources of computer 140. In addition, there is no need to center or otherwise translate the position of cross-section 252 for purposes of the calculation, thus saving additional computational resources. In process 238, computer 140 calculates an estimate of the time that would be required to scan cross-section $252_0$ in the manner illustrated in FIG. 8a, and stores this estimate in its memory.

Computer 140 next determines whether any remaining rotational angles are to be estimated for current cross-section j. If so (decision 239 is YES), index m for rotational angle $\phi_m$ is incremented (or decremented, if appropriate), in process 240, and control returns to processes 236, 238 for the rotation of current cross-section j and the calculation of its estimated sample fill scan time, respectively.

Figure 8B:
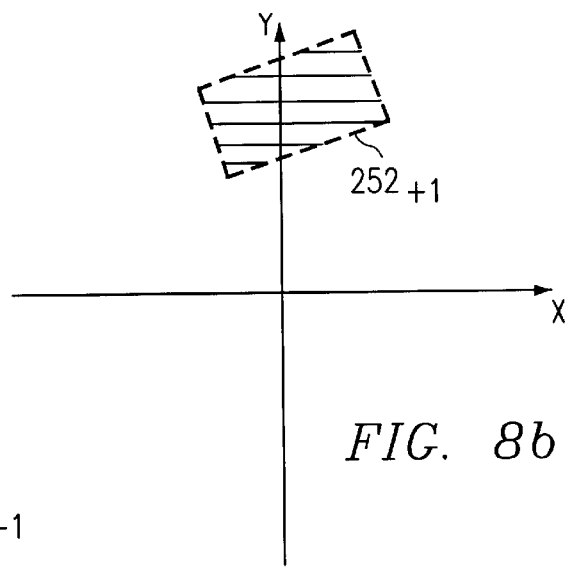
Figure 8C:
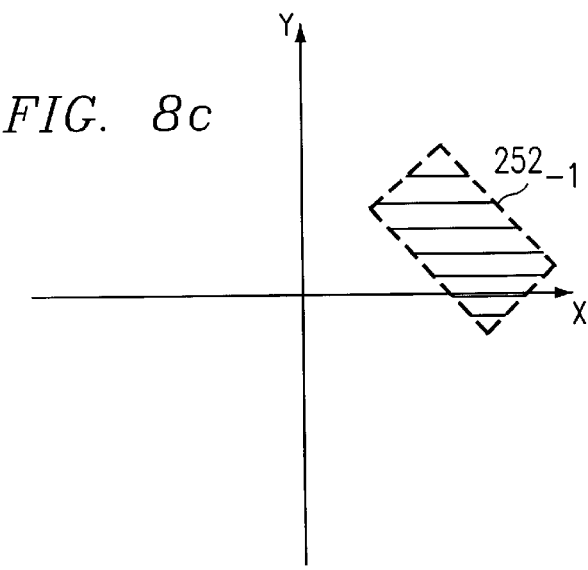

FIGS. 8b and 8c illustrate two other exemplary rotated cross-sections $252_{+1}$, $252_{-1}$, for comparison with non-rotated cross-section $252_0$. In FIG. 8b, cross-section $252_{+1}$ is rotated in a positive angular direction by one incremental angle Δ, which in this example is 22.5°. As evident from FIG. 8b, the simulated scan lines are again parallel to the x-axis. In FIG. 8c, cross-section $252_1$ is illustrated as rotated from non-rotated cross-section $252_0$ by one incremental angle Δ in the negative angular direction, which in this example is −22.5°. Again, its sampled simulated scan lines are parallel to the x-axis.

It is of course contemplated that, in performing process 225 to test the scan fill time of the rotated cross-sections, computer 140 may alternatively rotate the angle of the simulated scan lines while maintaining the orientation of the cross-section fixed, rather than rotating the angular orientation of the cross-section and maintaining the scan direction fixed. According to this embodiment of the invention, and using currently available CAD routines, iteratively rotating the cross-section itself is more computationally efficient.

Upon determining that all desired rotations of current cross-section j have been simulated and their estimated fill scan time stored (decision 239 is NO), one additional simulation is performed according to the preferred embodiment of the invention. In process 242, computer 140 refers to the contour of current cross-section j as generated in process 222, and determines the angle at which the longest outline vector segment is oriented in that current cross-section. Once this angle is found, computer 140 then rotates cross-section j by the arithmetic inverse of this angle, so that a rotated cross-section is derived in which the longest outline vector segment is parallel to the simulated scan lines (in this example, parallel to the x-axis). Referring to the example of FIG. 8a, the longest outline vector of cross-section 252 is the longer side of the rectangle, which is at an angle approximately −18° from the x-axis; in this example, therefore, process 242 will rotate cross-section 252 by an angle of +18°. The sampled simulated fill scan time is then calculated for this rotation, and the result stored in memory, by computer 140 in process 242.

Referring back to FIG. 5, following the calculation of estimated fill scan times for each of the desired trial rotations of current cross-section j in process 225, computer 140 interrogates these stored estimated fill scan times to identify the minimum estimate, and the rotation associated with that minimum estimated fill scan time, in process 226. Referring back to the example of FIGS. 8a through 8c, among the three exemplary rotated cross-sections 252, cross-section $252_{+1}$ has the minimum fill scan time, considering that it is intersected by fewer scan lines than the others. However, because cross-section 252 is rectangular, the rotation parallel to the longest side as used in process 242, will provide the true minimum, and therefore, in this example, the optimum angle of rotation is approximately 18°.

In process 228, the actual fill scans are generated for current cross-section j, based upon the rotation selected in process 226, and stored in the memory of computer 140 for use in the actual selective laser sintering process. These fill scans are rotated from the nominal fast scan axis (e.g., the x-axis) by the arithmetic inverse of the angle of rotation $\phi_m$ associated with the rotation selected in process 226, so that, in the selective laser sintering process, current cross-section j will be scanned at the optimum angle of rotation $\phi_m$ determined in process 226. In addition, the spacing of the fill scans derived in process 228 corresponds to the value of the fill scan spacing parameter L selected and stored in process 218.

Figure 8D:
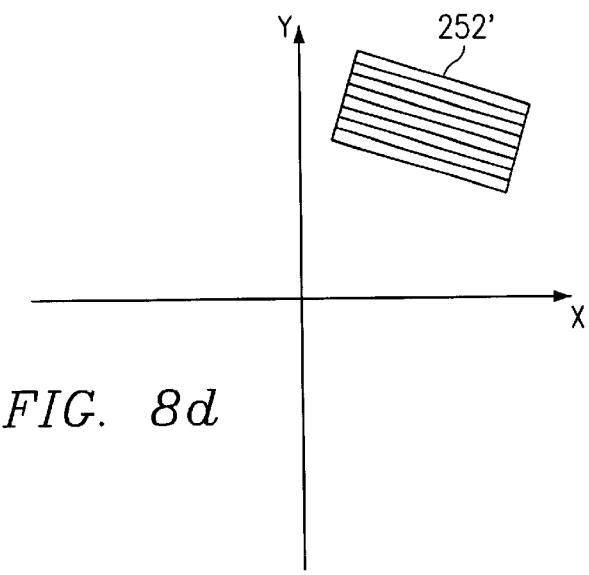

FIG. 8d illustrates the result of process 228 as applied to cross-section 252, based upon its optimal rotation. As shown in FIG. 8d, cross-section 252' is at a non-rotated position, in other words corresponding to non-rotated cross-section $252_0$ shown in FIG. 8a. However, the fill scans in cross-section 252' are not parallel to the x-axis as in the estimates of FIGS. 8a through 8c, but instead are rotated from the x-axis by the inverse of its optimum rotation. In this example, because the selected optimal cross-section $252_{+1}$, was at a rotation of +18°, each of the fill scans in cross-section 252' of FIG. 8d are rotated from the x-axis by −18°.

Preferably, as described in the above-incorporated application Ser. No. 10/205,698 entitled "Selective Laser Sintering With Interleaved Fill Scan", or alternatively in United Kingdom Patent Application 0118652.7, filed Jul. 31, 2001, also incorporated herein by this reference, the fill scans for current cross-section j that are generated in process 228 are not only separated from one another by the value of fill scan spacing parameter L, but are positioned relative to the x-y coordinate plane and not to the boundary of cross-section j itself. In addition, the positions of the fill scans are offset from one another, in successive layers k, by one-half the value of fill scan spacing parameter L to maximize the structural strength of the object as formed by selective laser sintering.

Upon generating and storing the fill scans for current cross-section j in layer k at the optimal rotation in process 228, decision 229 is performed by computer 140 to determine whether additional cross-sections remain for which fill scans are to be generated. If so (decision 229 is YES), index j for cross-sections within the current layer is incremented in process 230, and control returns to process 222 for the generation of the outline contour vectors and optimized fill scans for the next cross-section.

Figure 2:
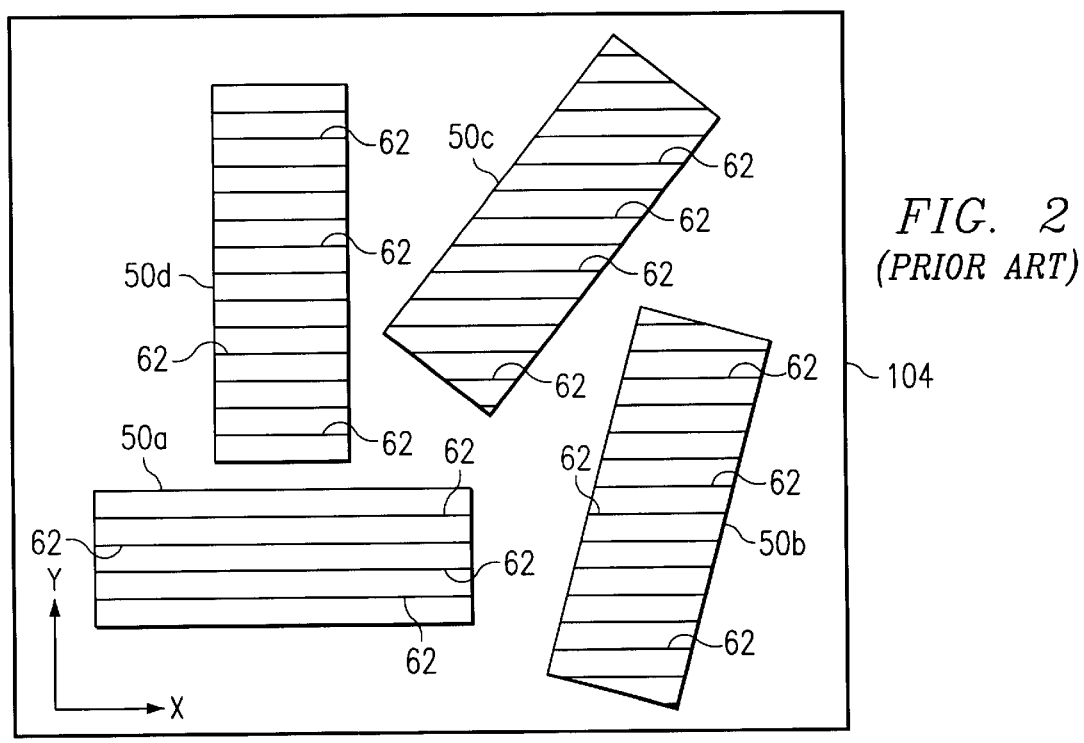
FIG. 2 is a plan view of a portion of a layer of powder, in which multiple cross-sections of articles are formed according to the prior art.
Figure 9:
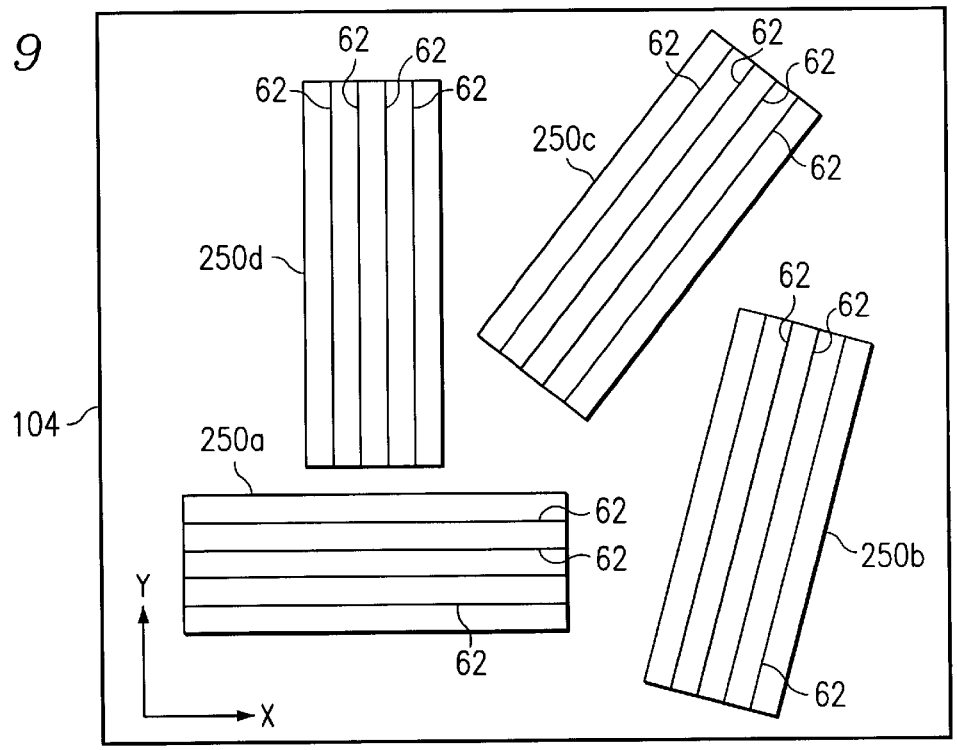
FIG. 9 is a plan view of a portion of a layer of powder, in which multiple cross-sections of articles are formed according to the prior preferred embodiment of the invention.

The skilled reader will recognize that, if multiple cross-sections are present in the current layer k, each cross-section has its own optimized scan direction derived independently from that of the other cross-sections in that layer k. FIG. 9 illustrates, in plan view, rectangular cross-sections 250a, 250b, 250c, 250d at target surface 104, with their fill scans 62 shown as generated according to the preferred embodiment of the invention described above. Cross-sections 250 of FIG. 9 correspond to the same shape, size, and position as cross-sections 50 of FIG. 2. Comparison of fill scans 62 for cross-sections 250 with fill scans 62 of cross-sections 50 illustrate the optimization provided by the present invention. Each of cross-sections 250 have the minimum number of scans (e.g., four), regardless of their orientation. In contrast, for cross-sections 50 of FIG. 2, which each have fill scans 62 in the same fast scan direction, parallel to the x-axis, only cross-section 50a (which happens to be oriented with its longest sides parallel to the x-axis) is optimized; cross-sections 50b, 50c, 50d all require many more than the optimized, minimum, number of fill scans 62.

Upon determining that no additional layers remain to be processed (decision 229 is NO), the generation of fill vectors for the current build cycle is complete. Control then passes to the first instance of process 206 (FIG. 4), to begin the actual layerwise fabrication of the article or articles by way of selective laser sintering. Alternatively, as discussed above, process 204 may be performed as a batch operation for all layers of the build cycle prior to initiating the actual build, or may alternatively be performed in real-time during the build.

Referring back to FIG. 4 in combination with FIG. 3, the method of fabricating an article according to the preferred embodiment of the invention continues with the dispensing of a layer of powder at the surface of part bed 107 in process 206, for example by the translation of counter-rotating roller 118 (FIG. 1) to form the powder layer with minimal shear stress, as described in the above-incorporated U.S. Pat. No. 5,076,869. Other systems for dispensing a layer of powder may alternatively be used, including, for example, the delivery of a volume of powder from above the surface of part bed 107, and in front of a moving roller or scraper. Once the powder is dispensed, laser beam 105 is directed by computer 140 and scanning system 142 to selectively sinter the outline of the cross-sections in the current layer of powder in process 208, if vector outlining is to be performed.

In process 210, one of the article cross-sections in the current layer of powder at the surface of part bed 107 is raster scanned by laser beam 105, under the control of computer 140 and scanning system 142, according to the fill scan vectors generated for that cross-section in that layer in process 204. As discussed above, the direction of fill scan for each article cross-section in the current layer is optimized for the fastest scan time. Because of the independence in scan direction optimization among the various cross-sections, multiple cross-sections in any given layer are likely scanned in different fast-axis directions. Decision 211 is therefore performed to determine whether additional article cross-sections in this current layer remain to be raster scanned; if so (decision 211 is YES), control passes back to process 210 to perform the fill scan for that next cross-section.

Upon completion of the raster, or fill, scanning for each cross-section within the current layer in process 210 (decision 211 is NO), process 212 is optionally performed to vector-outline each article cross-section in the current layer. Alternatively, each cross-section may be outlined immediately prior to or after its fill scanning, after the fill scanning of another cross-section in that layer, or prior to the fill scanning of any one of the cross-sections in the current layer. Computer 140 then executes decision 213 to determine whether additional layers remain to be selectively sintered in the current build cycle. If so (decision 213 is YES), control passes to process 214, in which computer 140 increments index k of the layers, and initializes index j to refer to a first cross-section within that next layer. Control then passes back to process 204, for generation of the optimized fill vectors for the cross-sections in this next layer.

As is well-known in the art, extremely thin layers, for example on the order of a few tenths of a millimeter thick, are typically used in selective laser sintering. With such thin layers, in many cases the shape of article cross-sections often does not drastically change from layer to layer. Accordingly, it is contemplated that the optimized fill scan calculations according to the preferred embodiment of the invention need not necessarily be performed for every layer, but may alternatively be applied periodically to layers in the sequence. Such sampling of the layers in optimizing the scan direction will be especially useful in systems that have limited computational capacity for computer 140, or in which computer 140 is burdened by other tasks involved in the selective laser sintering build cycle. Further in the alternative, computer 140 may analyze the article or articles involved in the build cycle, and apply a rule-based or other adaptive algorithm to determine which specific layers in the build ought to be processed for scan direction optimization; for example, computer 140 may identify those layers at which significant changes in the article cross-sections are present.

Following the generation of optimized fill vectors for the next layer, process 206 is next performed, to dispense the next layer of powder over the previously sintered layer. Processes 208 and 210 then control laser beam 105 to fill scan and vector outline the cross-sections in this new layer, in the manner described above.

The process continues, via decision 213, until the build cycle is complete (decision 213 is NO). Cool down of part bed 107 including the sintered article or articles is then carried out as appropriate for the material used, followed by removal of the loose powder from around the articles. Post processing, such as an anneal or infiltration of the articles with another material to improve the properties of the article, is then performed as desired, completing the fabrication of the articles.

The present invention provides important advantages in selective laser sintering, particularly in improving the efficiency and manufacturing capacity of selective laser sintering systems. It is contemplated that the overall build cycle time can be significantly reduced through the implementation of this invention. This improvement in build cycle time is available at little cost, other than computational resources of the system computer. Considering the significant advances in the capability of modern microprocessors and computer systems, it is therefore contemplated that adequate computational resources are available for use according to this invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of fabricating at least one three-dimensional article, comprising the steps of:

receiving a computer-readable representation of the at least one article;

for each of a plurality of layers of the at least one article, operating a computer to perform a sequence of operations comprising:

defining the position of at least one cross-section to be formed in the layer;

for each of a plurality of rotational angles, estimating a fill scan time for the raster scanning of the at least one cross-section;

selecting the one of the plurality of rotational angles corresponding to the lowest estimated fill scan time;

deriving fill scan vectors corresponding to the intersection of the at least one cross-section with lines in the coordinate system at an angle, relative to a coordinate axis, corresponding to the selected rotational angle; and storing the derived vectors in computer memory;

dispensing a layer of a powder at a target surface;

scanning an energy beam at selected locations of the layer of powder according to the vectors stored in the computer memory;

repeating the dispensing and scanning steps for a plurality of layers of powder to form the article.

2. The method of claim 1, wherein, for at least one of the layers, a plurality of cross-sections are defined;

and wherein the estimating, selecting, deriving, and storing steps are repeated for each of the plurality of cross-sections.

3. The method of claim 1, further comprising:

for the at least one cross-section, deriving outline vectors corresponding to boundaries of the cross-section.

4. The method of claim 3, further comprising:

storing the derived outline vectors in the computer memory, for use in the scanning step.

5. The method of claim 3, wherein one of the plurality of rotational angles corresponds to an angle of a longest outline vector of the cross-section relative to the coordinate axis.

6. The method of claim 5, further comprising:

storing the derived outline vectors in the computer memory, for use in the scanning step.

7. The method of claim 1, further comprising:

storing, in computer memory, a fill scan spacing value as a selected pitch between adjacent one of the fill scan vectors derived in the deriving step;

storing a sample ratio corresponding to a fraction of a density of the fill scan vectors corresponding to the selected pitch.

8. The method of claim 1, wherein the storing step is performed for each of the plurality of layers prior to the dispensing of a first layer of a powder at the target surface.

9. An apparatus for fabricating a three-dimensional object, comprising:

a powder delivery system, for applying successive layers of powder;

a laser for generating a laser beam;

a scanning system, for controllably directing the laser beam to a target plane at the surface of a layer of powder; and a computer, coupled to the scanning system, and programmed to perform a plurality of operations comprising:

defining the position of at least one cross-section to be formed in the layer;

for each of a plurality of rotational angles, estimating a fill scan time for the raster scanning of the at least one cross-section;

selecting the one of the plurality of rotational angles corresponding to the lowest estimated fill scan time;

deriving fill scan vectors corresponding to the intersection of the at least one cross-section with lines in the coordinate system at an angle, relative to a coordinate axis, corresponding to the selected rotational angle;

storing the fill scan derived vectors in computer memory; and controlling the scanning system to direct the laser beam at the target surface according to the stored derived fill scan vectors.

10. The apparatus of claim 9, wherein the plurality of operations further comprises:

for the at least one cross-section, deriving outline vectors corresponding to boundaries of the cross-section.

11. The apparatus of claim 10, wherein the computer is also programmed to control the scanning system to direct the laser beam according to the derived outline vectors.

12. The apparatus of claim 9, further comprising:

a moveable part piston for supporting the successive layers of powder, the moveable part piston operable to move away from the scanning system between the applying of successive layers of powder, so that the target plane formed by each newly-applied layer of powder is at substantially the same distance from the scanning system.

13. The apparatus of claim 9, wherein one of the plurality of rotational angles corresponds to an angle of a longest outline vector of the cross-section relative to the coordinate axis.

14. The apparatus of claim 9, wherein the computer is operated to define, for at least one of the layers, a plurality of cross-sections;

and wherein the estimating, selecting, deriving, and storing operations are repeated by the computer for each of the plurality of cross-sections.

15. The apparatus of claim 9, wherein the plurality of operations further comprises:

storing, in computer memory, a fill scan spacing value as a selected pitch between adjacent one of the fill scan vectors derived in the deriving step;

storing a sample ratio corresponding to a fraction of a density of the fill scan vectors corresponding to the selected pitch.

16. The apparatus of claim 9, wherein the computer performs the storing operation for each of the plurality of layers prior to the dispensing of a first layer of a powder at the target surface.

* * * * *